United States Patent
Kim et al.

(10) Patent No.: US 12,531,980 B2
(45) Date of Patent: Jan. 20, 2026

(54) VIDEO CODING METHOD DERIVING BIDIRECTIONAL PREDICTION WEIGHT INDEX

(71) Applicant: SK TELECOM CO., LTD., Seoul (KR)

(72) Inventors: Jae Il Kim, Seoul (KR); Sun Young Lee, Seoul (KR); Jae Seob Shin, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 16 days.

(21) Appl. No.: 18/773,724

(22) Filed: Jul. 16, 2024

(65) Prior Publication Data

US 2024/0372990 A1    Nov. 7, 2024

Related U.S. Application Data

(63) Continuation of application No. 17/623,438, filed as application No. PCT/KR2020/008386 on Jun. 26, 2020, now Pat. No. 12,063,352.

(30) Foreign Application Priority Data

Jun. 28, 2019 (KR) .................. 10-2019-0078381
Dec. 3, 2019 (KR) .................. 10-2019-0158986

(51) Int. Cl.
*H04N 19/105* (2014.01)
*H04N 19/136* (2014.01)
(Continued)

(52) U.S. Cl.
CPC ......... *H04N 19/105* (2014.11); *H04N 19/136* (2014.11); *H04N 19/159* (2014.11); *H04N 19/176* (2014.11)

(58) Field of Classification Search
CPC .. H04N 19/105; H04N 19/136; H04N 19/159; H04N 19/176; H04N 19/52; H04N 19/577; H04N 19/119; H04N 19/70
(Continued)

(56) References Cited

U.S. PATENT DOCUMENTS

2009/0034854 A1    2/2009  Lee et al.
2012/0236943 A1    9/2012  Lee et al.
(Continued)

FOREIGN PATENT DOCUMENTS

CN    109417629 A    3/2019
CN    109496430 A    3/2019
(Continued)

OTHER PUBLICATIONS

Chinese Office Action issued on May 29, 2025, in connection with the corresponding Chinese Patent Application No. 202080060741.2, with its English translation, 18 pages.
(Continued)

*Primary Examiner* — Marnie A Matt
(74) *Attorney, Agent, or Firm* — Hauptman Ham, LLP

(57) ABSTRACT

Disclosed is a method for deriving a bidirectional prediction weight index of a constructed candidate included in an affine merge candidate list. The method comprises: determining whether a plurality of target control points are available from among control points set for a current block; if the target control points are available, then checking prediction directions and reference pictures of the target control points; and if the prediction directions of the target control points are all bidirectional and the reference pictures of the target control points are the same, then deriving the bidirectional prediction weight index of the constructed candidate from among bidirectional prediction weight index candidates of the target control points.

9 Claims, 11 Drawing Sheets

(51) Int. Cl.
*H04N 19/159* (2014.01)
*H04N 19/176* (2014.01)

(58) Field of Classification Search
USPC .................................................. 375/240.02
See application file for complete search history.

(56) References Cited

U.S. PATENT DOCUMENTS

| | | |
|---|---|---|
| 2018/0241998 A1 | 8/2018 | Chen et al. |
| 2019/0028731 A1 | 1/2019 | Chuang et al. |
| 2019/0158870 A1 | 5/2019 | Xu et al. |
| 2019/0230350 A1 | 7/2019 | Chen et al. |
| 2019/0297325 A1 | 9/2019 | Lim et al. |
| 2020/0236384 A1* | 7/2020 | Xu ................... H04N 19/107 |
| 2020/0374545 A1* | 11/2020 | Lai ................... H04N 19/593 |
| 2021/0076061 A1 | 3/2021 | Lin et al. |
| 2021/0084291 A1 | 3/2021 | Chang et al. |
| 2021/0092390 A1 | 3/2021 | Chen et al. |
| 2021/0112254 A1 | 4/2021 | Ahn |
| 2021/0211644 A1 | 7/2021 | Su et al. |
| 2022/0124312 A1* | 4/2022 | Park ................... H04N 19/159 |
| 2022/0239937 A1 | 7/2022 | Park et al. |

FOREIGN PATENT DOCUMENTS

| | | |
|---|---|---|
| KR | 10-2009-0012926 A | 2/2009 |
| KR | 10-2017-0124080 A | 11/2017 |
| KR | 10-2019-0018624 A | 2/2019 |
| WO | 2018/097692 A2 | 5/2018 |

OTHER PUBLICATIONS

Korean Office Action issued on Apr. 29, 2025, in connection with the corresponding Korean Patent Application No. 10-2019-0158986, with its English translation, 8 pages.

International Search Report issued on Sep. 22, 2020, for corresponding International Patent Application No. PCT/KR2020/008386.

Written Opinion issued on Sep. 22, 2020, for corresponding International Patent Application No. PCT/ KR2020/008386.

Jie Chen et al., "Non-CE2: Gbi inheritance for constructed affine merge candidate," Joint Video Experts Team (JVET) of ITU-T SG 16 WP 3 and ISO/IEC JTC 1/SC 29/WG 11, 14th Meeting: Geneva, CH, Mar. 22, 2019, JVET-N481-v6, pp. 1-4; Cited in NPL Nos. 1 and 2.

* cited by examiner (A)

(B)

VIDEO CODING METHOD DERIVING BIDIRECTIONAL PREDICTION WEIGHT INDEX

CROSS-REFERENCE TO RELATED APPLICATION

This application is a Continuation of U.S. patent application Ser. No. 17/623,438, filed on Dec. 28, 2021, which is a national phase of PCT/KR2020/008386 filed on Jun. 26, 2020, which is based on and claims priority to Korean Patent Application No. 10-2019-0078381 filed on Jun. 28, 2019, and Korean Patent Application No. 10-2019-0158986 filed on Dec. 3, 2019. All of the aforementioned applications are incorporated herein by reference in their entireties.

TECHNICAL FIELD

The present invention relates to encoding and decoding of an image, and more particularly, to a method of deriving a bidirectional prediction weight index, in which encoding and decoding efficiency is improved by more efficiently deriving a bidirectional prediction weight index, and a video decoding apparatus.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

The present invention is directed to providing an improved video encoding and decoding technique in order to meet the above needs, and in particular, one aspect of the present invention relates to a technique for improving encoding and decoding efficiency by deriving a weight index of a current block according to a direction, in which weight indexes set for control points give a greater weight, among two directions.

Technical Solution

According to at least one aspect, the present disclosure provides a method of deriving a bidirectional prediction weight index of a constructed candidate included in an affine merge candidate list. The method comprises: determining whether a plurality of target control points are available from among control points set for a current block; when the target control points are available, checking prediction directions and reference pictures of the target control points; and when all the prediction directions of the target control points are bidirectional and the reference pictures of the target control points are identical, deriving the bidirectional prediction weight index of the constructed candidate from bidirectional prediction weight index candidates of the target control points.

According to another aspect, the present disclosure provides a video decoding apparatus. The apparatus comprises: a determination unit configured to determine whether a plurality of target control points are available from among control points set for a current block; a check unit configured to check prediction directions and reference pictures of the target control points when the target control points are available; and a derivation unit configured to derive a bidirectional prediction weight index of a constructed candidate included in an affine merge candidate list from bidirectional prediction weight index candidates of the target control points when all the prediction directions of the target control points are bidirectional and the reference pictures of the target control points are identical.

Advantageous Effects

As described above, according to an embodiment of the present invention, by more accurately expressing a motion through an affine prediction method, it is possible to increase prediction accuracy and improve encoding and decoding efficiency.

DETAILED DESCRIPTION

Figure 1:
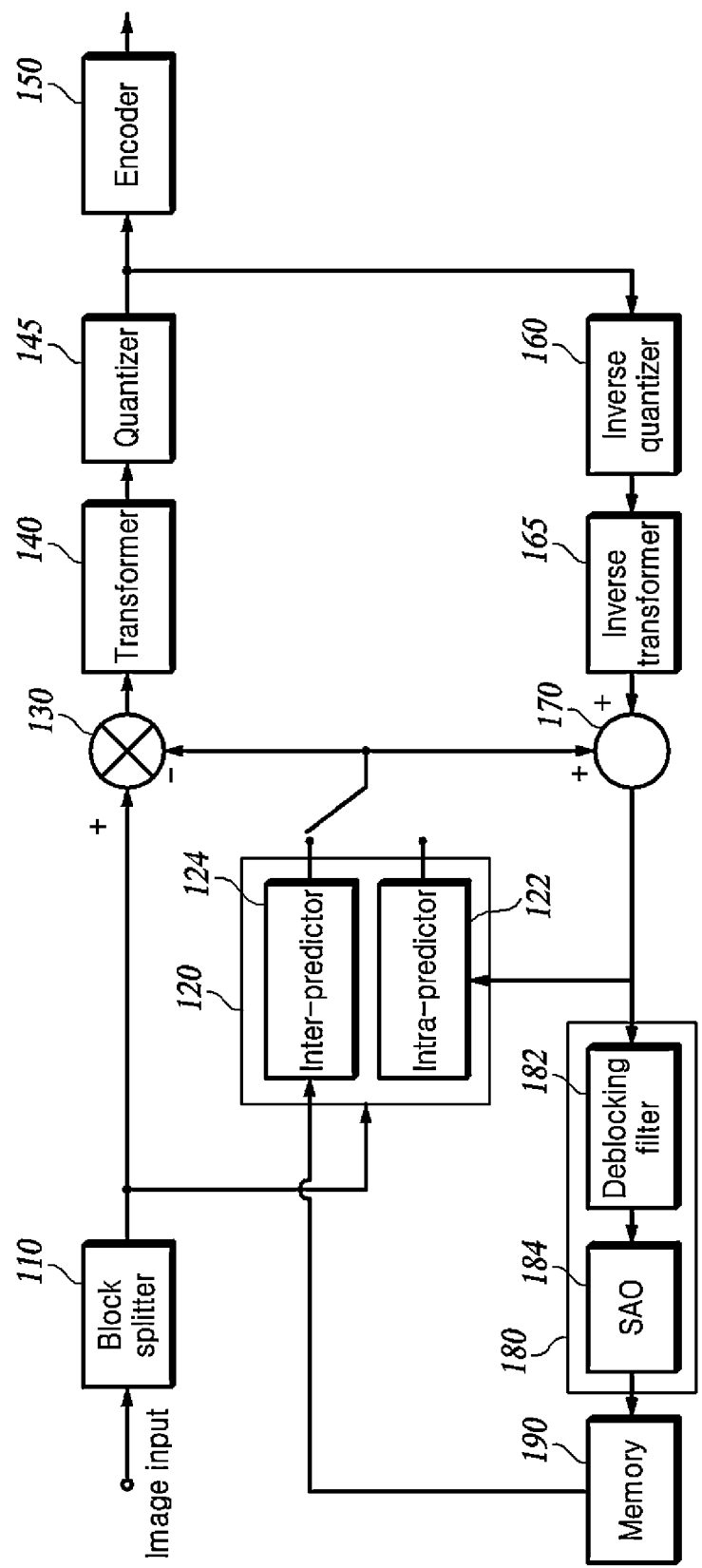
FIG. 1 is an exemplary block diagram of a video encoding apparatus capable of implementing the techniques of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as a syntax of the CU, and information applied to CUs included in one CTU in common is encoded as a syntax of the CTU. In addition, information applied to all blocks in one tile in common is encoded as a syntax of the tile or encoded as a syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as a syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
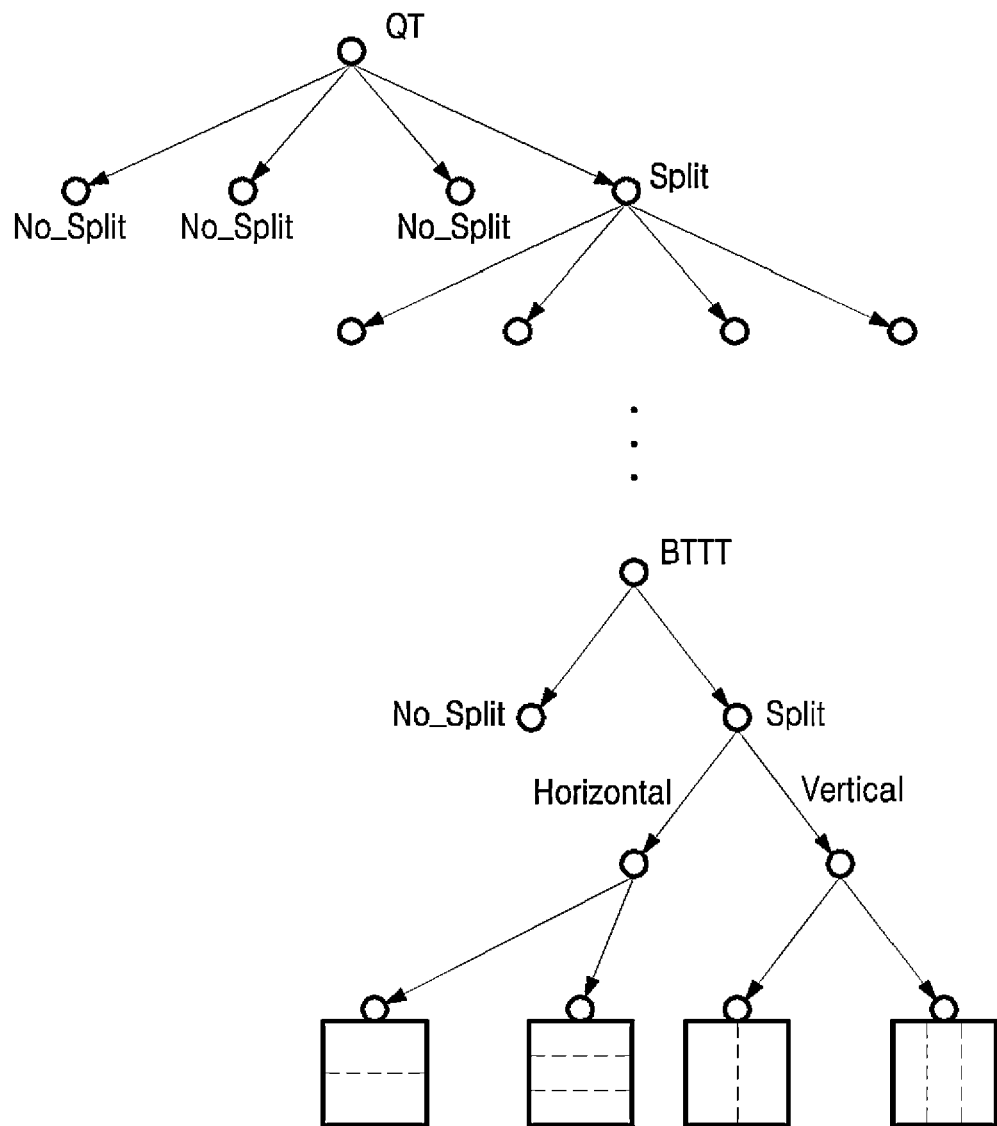
FIG. 2 exemplarily shows block partitioning structure using a QTBTTT structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has not been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both uni-directional prediction and bi-directional prediction.

Figure 3:
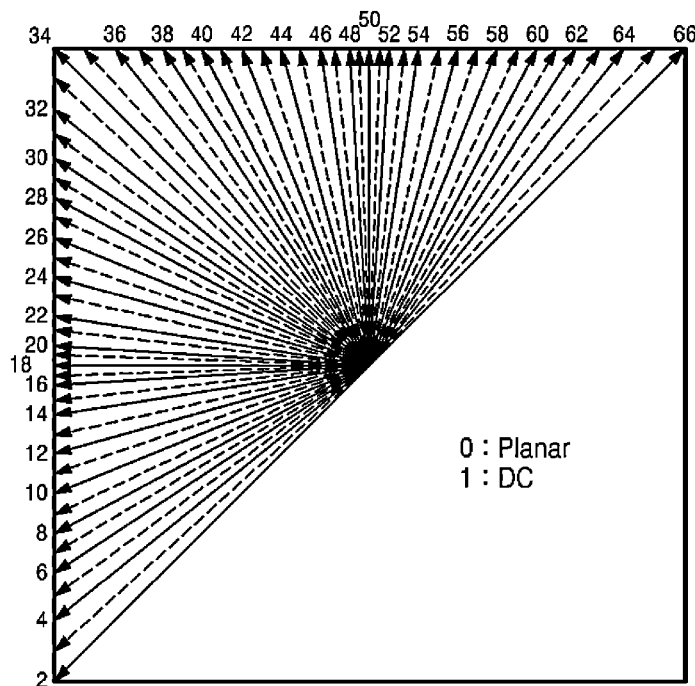
FIG. 3 exemplarily shows a plurality of intra-prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
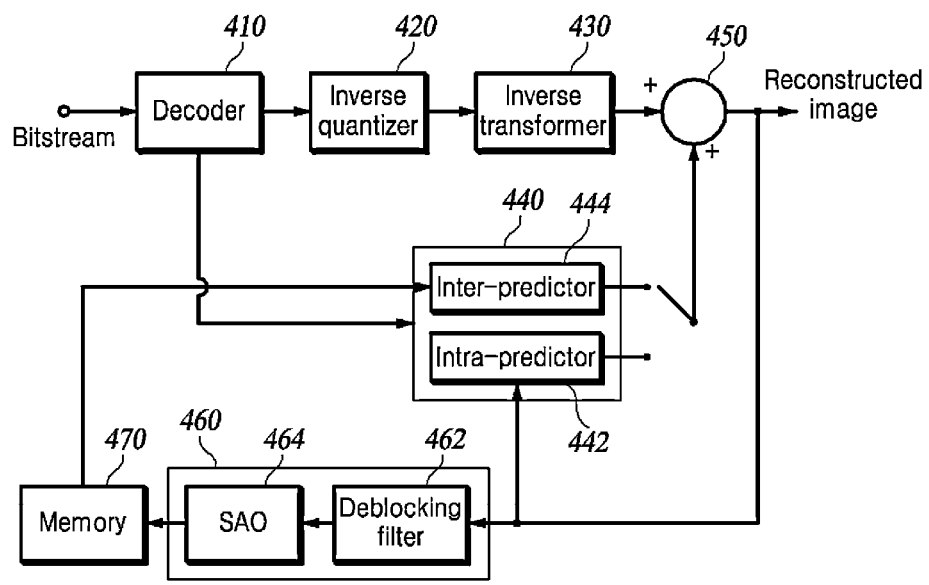
FIG. 4 is an exemplary block diagram of a video decoding apparatus capable of implementing the techniques of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

The inter prediction method may be classified into a skip mode, a merge mode, and an adaptive (or advanced) motion vector predictor (AMVP) mode.

In the skip mode, any one piece of motion information among motion information candidates of neighboring blocks located around the current block is signaled from the video encoding apparatus to the video decoding apparatus. In the merge mode, any one piece of motion information among the motion information candidates of the neighboring blocks and information on residuals generated through the prediction are encoded and signaled. In the AMVP mode, motion information of the current block and the information on the residuals generated through the prediction are encoded and signaled.

The motion information signaled in the skip mode and the merge mode is expressed as an index (merge index) value indicating any one of the motion information candidates (in other words, any one of motion information candidates included in a candidate list). The motion information signaled in the AMVP mode is expressed as a difference value (motion vector difference (MVD)) between the motion information of the neighboring block and the motion information of the current block.

Each of flags (cu_skip_flag and merge_flag) for distinguishing the skip mode from the merge mode is signaled from the video encoding apparatus to the video decoding apparatus, and a merge index (merge_idx) is signaled to the video decoding apparatus according to values of the flags. A method of constructing the candidate list or a method of signaling the merge index in the skip mode may be performed in the same manner as that in the merge mode. In the AMVP mode, prediction direction information (inter_pred_idc), reference picture indexes (ref_idx_l0 and ref_idx_l1), information (mvp_l0_flag and mvp_l1_flag) indicating motion information candidates to be used for prediction of the current block, and MVDs may be signaled. In this case, the number of signaled MVDs is determined according to the number of prediction directions. For example, one MVD is signaled in case of unidirectional prediction and two MVDs are signaled in case of bidirectional prediction.

In the skip mode, the size of the current block may be 2N×2N, whereas in the merge mode, the size of the current block may be 2N×2N, 2N×N, N×2N, or an asymmetric partition. When the current block has a size of 2N×2N and all zero transform coefficients, the current block is classified as being in the skip mode. In the AMVP mode, the size of the current block may be 2N×2N, 2N×N, N×2N, or an asymmetric partition.

The pieces of information, which are signaled from the video encoding apparatus to the video decoding apparatus in the skip mode, the merge mode, and the AMVP mode, are expressed as in Tables 1 to 3.

TABLE 1

| | Descriptor |
|---|---|
| coding_unit( x0, y0, log2CbSize ) { | |
|   if( slice_type != I ) | |
|     cu_skip_flag[ x0 ][ y0 ] | ae(v) |
|   if( cu_skip_flag[ x0 ][ y0 ] ) | |
|     prediction_unit( x0, y0, nCbS, nCbS ) | |
|   else { | |
|     if( slice_type != I ) | |
|       pred_mode_flag | ae(v) |
|     ... | |
|     if( CuPredMode[ x0 ][ y0 ] != MODE_INTRA || log2CbSize == MinCbLog2Size Y ) | |
|       part_mode | ae(v) |
|     if( CuPredMode[ x0 ][ y0 ] == MODE_INTRA ) { | |
|       ... | |
|     } else { | |
|       if( PartMode == PART_2Nx2N ) | |
|         prediction_unit( x0, y0, nCbS, nCbS ) | |
|         ... | |
|     } ... | |
|   } | |
|   ... | |

TABLE 2

| | Descriptor |
|---|---|
| prediction_unit( x0, y0, nPbW, nPbH ) { | |
|   if( cu_skip_flag[ x0 ][ y0 ] ) { | |
|     if( MaxNumMergeCand > 1 ) | |
|       merge_idx[ x0 ][ y0 ] | ae(v) |
|   } else { /* MODE_INTER */ | |
|     merge_flag[ x0 ][ y0 ] | ae(v) |
|     if( merge_flag[ x0 ][ y0 ] ) { | |
|       if( MaxNumMergeCand > 1 ) | |
|         merge_idx[ x0 ][ y0 ] | ae(v) |
|     } else { | |
|       if( slice_type == B ) | |
|         inter_pred_idc[ x0 ][ y0 ] | ae(v) |
|       if( inter_pred_idc[ x0 ][ y0 ] != PRED_L1 ) { | |
|         if( num_ref_idx_l0_active_minus1 > 0 ) | |
|           ref_idx_l0[ x0 ][ y0 ] | ae(v) |
|         mvd_coding( x0, y0, 0 ) | |
|         mvp_l0_flag[ x0 ][ y0 ] | ae(v) |
|       } | |
|       if( inter_pred_idc[ x0 ][ y0 ] != PRED_L0 ) { | |
|         if( num_ref_idx_l1_active_minus1 > 0 ) | |
|           ref_idx_l1[ x0 ][ y0 ] | ae(v) |
|         if( mvd_l1_zero_flag && inter_pred_idc[ x0 ][ y0 ] == PRED_BI ) { | |
|           MvdL1[ x0 ][ y0 ][ 0 ] = 0 | |
|           MvdL1[ x0 ][ y0 ][ 1 ] = 0 | |
|         } else | |
|           mvd_coding( x0, y0, 1 ) | |

TABLE 2-continued

| | Descriptor |
|---|---|
|         mvp_l1_flag[ x0 ][ y0 ]<br>      }<br>    }<br>  }<br>} | ae(v) |

TABLE 3

| | Descriptor |
|---|---|
| mvd_coding( x0, y0, refList ) { | |
|   abs_mvd_greater0_flag[ 0 ] | ae(v) |
|   abs_mvd_greater0_flag[ 1 ] | ae(v) |
|   if( abs_mvd_greater0_flag[ 0 ] ) | |
|     abs_mvd_greater1_flag[ 0 ] | ae(v) |
|   if( abs_mvd_greater0_flag[ 1 ] ) | |
|     abs_mvd_greater1_flag[ 1 ] | ae(v) |
|   if( abs_mvd_greater0_flag[ 0 ] ) { | |
|     if( abs_mvd_greater1_flag[ 0 ] ) | |
|       abs_mvd_minus2[ 0 ] | ae(v) |
|     mvd_sign_flag[ 0 ] | ae(v) |
|   } | |
|   if( abs_mvd_greater0_flag[ 1 ] ) { | |
|     if( abs_mvd_greater1_flag[ 1 ] ) | |
|       abs_mvd_minus2[ 1 ] | ae(v) |
|     mvd_sign_flag[ 1 ] | ae(v) |
|   } | |
| } | |

In a candidate list for the skip mode and the merge mode, up to four spatial candidates, up to one temporal candidate, combined bidirectional candidates, and a zero motion vector candidate may be included. The video encoding/decoding apparatus may construct the candidate list in the order of the spatial candidates→the temporal candidate→the combined bidirectional candidates→the zero motion vector candidate.

Figure 5:
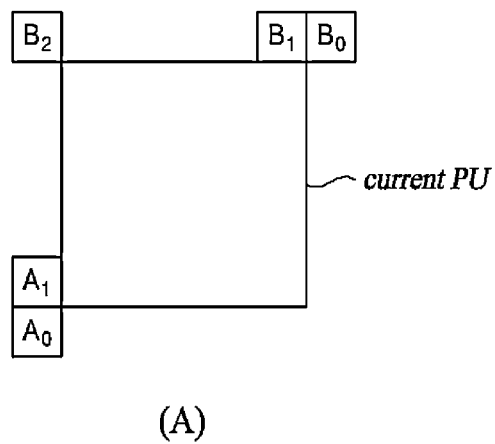
FIG. 5 illustrates diagrams for describing positions of spatial/temporal candidate blocks.
Figure 5:
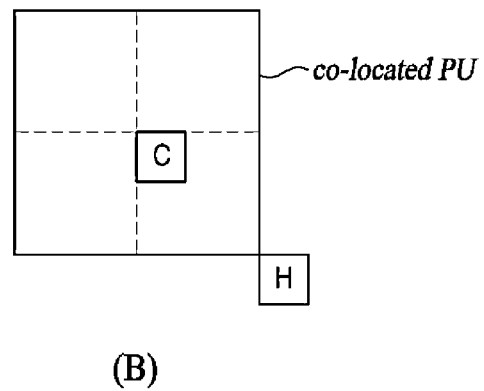

Positions of candidate blocks for the spatial candidates and temporal candidate are illustrated in FIG. 5. FIG. 5(A) illustrates positions of spatial candidate blocks adjacent to a current prediction block (PU), and FIG. 5(B) illustrates positions of temporal candidate blocks based on a co-located PU.

The video encoding/decoding apparatus may search for spatial candidate blocks in the order of $A_1 \rightarrow B_1 \rightarrow B_0 \rightarrow A_0 \rightarrow B_2$ to set up to four spatial candidates. Further, the video encoding/decoding apparatus may search for temporal candidate blocks in the order of H→C to set up to one temporal candidate. When a newly derived candidate has the same motion information as a candidate that has been already included in the candidate list, the motion information of the derived candidate is not included in the candidate list. That is, duplication of data (candidate) is not allowed.

In the skip mode, the merge mode, and the AMVP mode described above, since the motion of the current block is expressed using only one motion vector, only a translation motion may be expressed. Therefore, in the skip mode, the merge mode, and the AMVP mode, various and complex motions such as rotation motions, expansion/contraction (scaling) motions, and the like cannot be processed.

In order to overcome such a limitation, in the present invention, an affine model-based motion compensation method or an affine mode, in which the motion of the current block is expressed using two or more motion vectors, is proposed.

The affine mode may be divided into an affine skip mode (affine_skip), an affine merge mode (affine_merge), and an affine AMVP mode (affine_amvp). Motion vectors used in the affine mode may be referred to as control point motion vectors (CPMVs), and control points (CPs) may refer to specific positions related to the current block for the affine mode.

Figure 6:
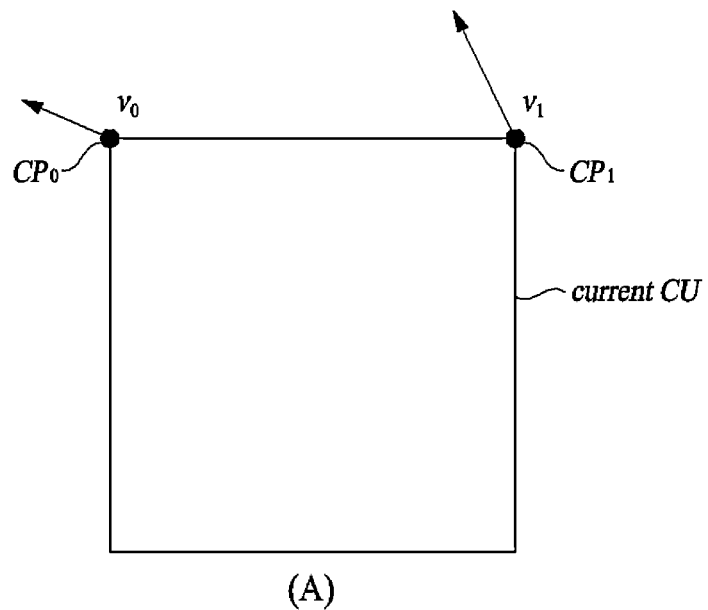
FIG. 6 illustrates diagrams for describing types of an affine model.
Figure 6:
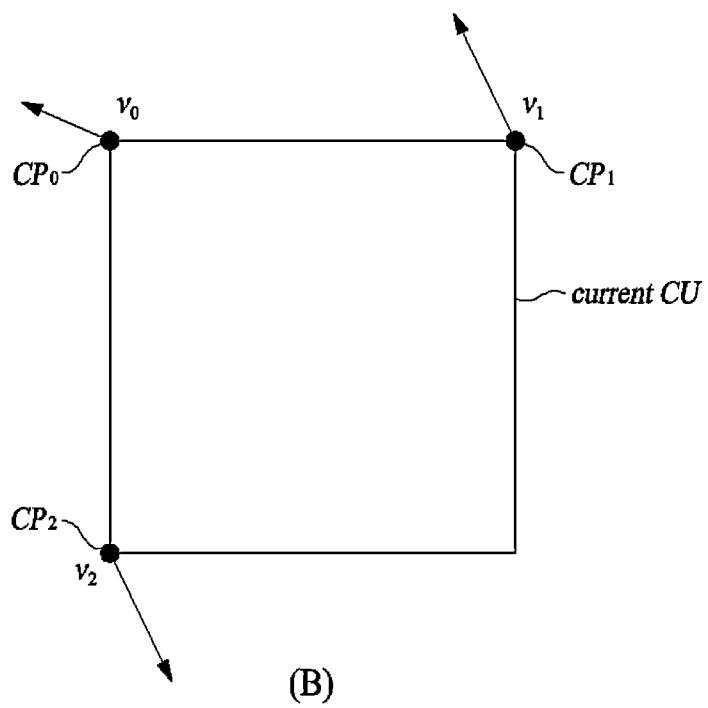

The affine mode may be divided into two models according to the number of CPMVs. Among the affine models, a first affine model is a 4-parameter model (see FIG. 6(A)) that uses two CPMVs (x and y) and a second affine model is a 6-parameter model (see FIG. 6(B)) that uses three CPMVs (x and y). In FIG. 6, $CP_0$ denotes a CP that is set ($0^{th}$ CP based on the assigned number) first for the current block, $CP_1$ denotes a CP that is secondly set ($1^{st}$ CP based on the assigned number), and $CP_2$ denotes a CP that is thirdly set ($2^{nd}$ CP based on the assigned number). $v_i$ denotes a $CPMV_i$ that is set to an $i^{th}$ $CP_i$.

In the affine mode, 1) deriving CPMVs according to the affine skip mode, the affine merge mode, or the affine AMVP mode, 2) deriving or generating a motion vector array of sub-blocks included in the current block using the derived CPMVs, and 3) performing motion compensation for each sub-block using the motion vector array of the sub-blocks may be performed.

1) Derivation of CPMVs According to Affine Skip Mode, Affine Merge Mode, or Affine AMVP Mode In the affine skip mode and the affine merge mode, a flag (merge_subblock_flag) indicating whether a mode is the affine merge mode is signaled. The merge_subblock_flag may be a flag indicating whether sub-block-based inter prediction parameters are inferred from neighboring blocks. When merge_subblock_flag=1 (on), an index (merge_subblock_idx) specifying any one of candidates included in the candidate list (sub-block-based merge candidate list or affine merge candidate list) is signaled. The CPMVs of the candidate specified by the index are derived as CPMVs for the current block. The method of constructing the candidate list will be described below.

Table 4 shows a syntax structure for the above process.

TABLE 4

| | Descriptor |
|---|---|
| merge_data( x0, y0, cbWidth, cbHeight ) { | |
|   ... | |
|   if( MaxNumSubblockMergeCand > 0 && cbWidth >= 8 && cbHeight >= 8 ) | |
|     merge_subblock_flag[ x0 ][ y0 ] | ae(v) |
|   if( merge_subblock_flag[ x0 ][ y0 ] = = 1 ) { | |
|     if( MaxNumSubblockMergeCand > 1 ) | |

TABLE 4-continued

| | Descriptor |
|---|---|
|     merge_subblock_idx[ x0 ][ y0 ]<br>  }<br>} ... | ae(v) |

In the affine AMVP mode, a flag (inter_affine_flag) indicating whether the affine AMVP mode is applied is signaled, and when inter_affine_flag=1 (on), a flag (cu_affine_type_flag) indicating the affine model (type of affine model) is additionally signaled. When cu_affine_type_flag=1, the affine model may be a 6-parameter model, and when cu_affine_type_flag=0, the affine model may be a 4-parameter model.

Further, motion information for the affine AMVP mode is also signaled. The signaled motion information may include prediction direction information (inter_pred_idc), reference picture indexes (ref_idx_l0 and ref_idx_l1), MVP indexes (mvp_l0_flag and mvp_l1_flag), and MVDs. The number of signaled MVDs is determined by the prediction direction and the affine model. As an example, when the prediction is unidirectional prediction and the affine model is the 4-parameter model, two MVDs are signaled, and when the prediction is unidirectional prediction and the affine model is the 6-parameter model, three MVDs are signaled. As another example, when the prediction is bidirectional prediction and the affine model is the 4-parameter model, four MVDs are signaled, and when the prediction is bidirectional prediction and the affine model is the 6-parameter model, six MVDs are signaled. The method of signaling the MVDs is the same as in the AMVP mode.

Table 5 shows a syntax structure for the above process.

TABLE 5

| | Descriptor |
|---|---|
| coding_unit( x0, y0, cbWidth, cbHeight, treeType ) {<br>  if( slice_type != I \|\| sps_ibc_enabled_flag ) {<br>    if( treeType != DUAL_TREE_CHROMA &&<br>      !( cbWidth = = 4 && cbHeight = = 4 && !sps_ibc_enabled_flag ) )<br>      cu_skip_flag[ x0 ][ y0 ] | ae(v) |
|     if( cu_skip_flag[ x0 ][ y0 ] = = 0 && slice_type != I<br>      && !( cbWidth = = 4 && cbHeight = = 4 ) )<br>      pred_mode_flag | ae(v) |
|     if( ( ( slice_type = = I && cu_skip_flag[ x0 ][ y0 ] = =0 ) \|\|<br>      ( slice_type != I && ( CuPredMode[ x0 ][ y0 ] != MODE_INTRA \|\|<br>      ( cbWidth = = 4 && cbHeight = = 4 && cu_skip_flag[ x0 ][ y0 ] = = 0 ) ) ) ) &&<br>      sps_ibc_enabled_flag && ( cbWidth != 128 \|\| cbHeight != 128 ) )<br>      pred_mode_ibc_flag | ae(v) |
|   }<br>  if( CuPredMode[ x0 ][ y0 ] = = MODE_INTRA ) {<br>    ...<br>  } else if( treeType != DUAL_TREE_CHROMA ) { /* MODE_INTER or MODE_IBC */<br>    if( cu_skip_flag[ x0 ][ y0 ] = = 0 )<br>      general_merge_flag[ x0 ][ y0 ] | ae(v) |
|     if( general_merge_flag[ x0 ][ y0 ] ) {<br>      merge_data( x0, y0, cbWidth, cbHeight )<br>    } else if ( CuPredMode[ x0 ][ y0 ] = = MODE_IBC ) {<br>      ...<br>    } else { /* MODE_INTER<br>      if( slice_type = = B )<br>        inter_pred_idc[ x0 ][ y0 ] | ae(v) |
|       if( sps_affine_enabled_flag && cbWidth >= 16 && cbHeight >= 16 ) {<br>        inter_affine_flag[ x0 ][ y0 ] | ae(v) |
|         if( sps_affine_type_flag && inter_affine_flag[ x0 ][ y0 ] )<br>          cu_affine_type_flag[ x0 ][ y0 ] | ae(v) |
|       }<br>      if( inter_pred_idc[ x0 ][ y0 ] != PRED_L1 ) {<br>        if( NumRefIdxActive[ 0 ] > 1 && !sym_mvd_flag[ x0 ][ y0 ] )<br>          ref_idx_l0[ x0 ][ y0 ] | ae(v) |
|         mvd_coding( x0, y0, 0, 0 )<br>        if( MotionModelIdc[ x0 ][ y0 ] > 0 )<br>          mvd_coding( x0, y0, 0, 1 )<br>        if(MotionModelIdc[ x0 ][ y0 ] > 1 )<br>          mvd_coding( x0, y0, 0, 2 )<br>        mvp_l0_flag[ x0 ]{ y0 ] | ae(v) |
|       }<br>      if( inter_pred_idc[ x0 ][ y0 ] != PRED_L0 ) {<br>        if( NumRefIdxActive[ 1 ] > 1 && !sym_mvd_flag[ x0 ][ y0 ] )<br>          ref_idx_l1[ x0 ][ y0 ] | ae(v) |
|         mvd_coding(x0, y0, 1, 0 )<br>        if( MotionModelIdc[ x0 ][ y0 ] > 0 )<br>          mvd_coding( x0, y0, 1, 1 )<br>        if(MotionModelIdc[ x0 ][ y0 ] > 1 )<br>          mvd_coding(x0, y0, 1, 2 ) | |

TABLE 5-continued

| | Descriptor |
|---|---|
|     mvp_l1_flag[ x0 ][ y0 ] | ae(v) |
|     } | |
|     if( sps_bcw_enabled_flag && inter_pred_idc[ x0 ][ y0 ] = = PRED_BI && | |
|         luma_weight_l0_flag[ ref_idx_l0 [ x0 ][ y0 ] ] = = 0 && | |
|         luma_weight_l1_flag[ ref_idx_l1 [ x0 ][ y0 ] ] = = 0 && | |
|         chroma_weight_l0_flag[ ref_idx_l0 [ x0 ][ y0 ] ] = = 0 && | |
|         chroma_weight_l1_flag[ ref_idx_l1 [ x0 ][ y0 ] ] = = 0 && | |
|         cbWidth * cbHeight >= 256 ) | |
|         bcw_idx[ x0 ][ y0 ] | ae(v) |
|     } | |
|   } | |
| } | |

2) Derivation or Generation of Motion Vector Array of Sub-Blocks Included in Current Block Using Derived CPMVs When the affine model is the 4-parameter model, two CPMVs are derived, and when the affine model is the 6-parameter model, three CPMVs are derived.

Figure 7:
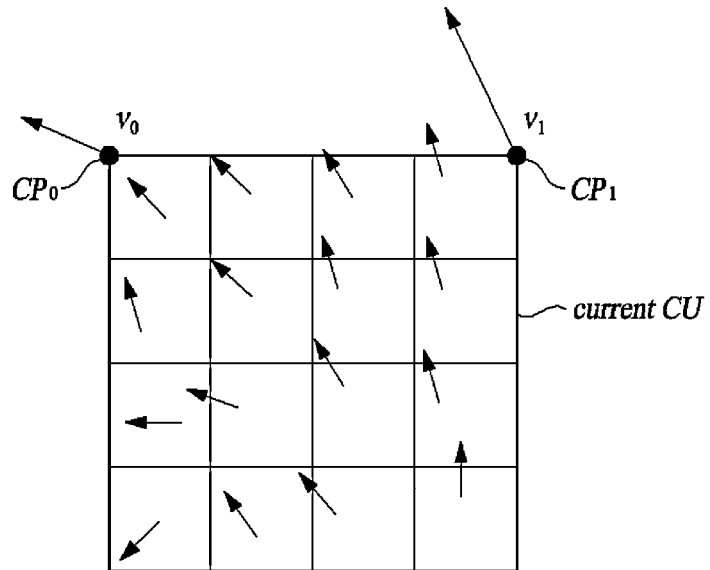
FIG. 7 is a diagram for describing a method of deriving motion information of a sub-block array using an affine mode.

When the affine model is the 4-parameter model, motion vectors of the sub-blocks included in the current block (CU) may be derived using the two derived CPMVs ($v_0$ and $v_1$), as illustrated in FIG. 7. Such a process may be performed using Equation 1.

$$\begin{cases} mv_x = \frac{mv_{1x} - mv_{0x}}{W}x + \frac{mv_{1y} - mv_{0y}}{W}y + mv_{0x} \\ mv_y = \frac{mv_{1y} - mv_{0y}}{W}x + \frac{mv_{1y} - mv_{0x}}{W}y + mv_{0y} \end{cases} \quad \text{[Equation 1]}$$

In Equation 1, $mv_x$ and $mv_y$ denote the motion vectors of the sub-blocks, $mv_{0x}$ and $mv_{0y}$ denote $CPMV_0$, $mv_{1x}$ and $mv_{1y}$ denote $CPMV_1$, x and y denote positions of samples located at the top left of the sub-blocks, W denotes a width of the current block, and H denotes a height of the current block.

When the affine model is the 6-parameter model, motion vectors of the sub-blocks included in the current block may be derived using the three derived CPMVs. Such a process may be performed using Equation 2.

$$\begin{cases} mv_x = \frac{mv_{1x} - mv_{0x}}{W}x + \frac{mv_{2x} - mv_{0x}}{H}y + mv_{0x} \\ mv_y = \frac{mv_{1y} - mv_{0y}}{W}x + \frac{mv_{2y} - mv_{0y}}{H}y + mv_{0y} \end{cases} \quad \text{[Equation 2]}$$

In Equation 2, $mv_{2x}$ and $mv_{2y}$ denote $CPMV_2$.

3) Performing of Motion Compensation for Each Sub-Block Using Motion Vector Array of Sub-Blocks By performing motion compensation for each sub-block using the motion vector of each of the sub-blocks, the current block may be predicted. When the prediction direction is bidirectional (inter_pred_idc=bi), a final prediction value may be generated by applying a bidirectional prediction weight to each of bidirectional prediction values.

The process of generating the final prediction value using the bidirectional prediction weight may be performed using Equation 3.

$$P_{bi-pred} = ((8 - w) * P_0 + w * P_1 + 4) >> 3 \quad \text{[Equation 3]}$$

In Equation 3, $P_{bi-pred}$ denotes the final prediction value, $P_0$ denotes a prediction value in a list 0 direction, $P_1$ denotes a prediction value in a list 1 direction, and w denotes a bidirectional prediction weight.

The bidirectional prediction weight is set to a value indicated by a bidirectional prediction weight index (bcw_idx). Table 6 shows the bow_idx and the bidirectional prediction weight thereof.

TABLE 6

| bcw_idx | 0 | 1 | 2 | 3 | 4 |
|---|---|---|---|---|---|
| w (L1) | 4/8 | 5/8 | 3/8 | 10/8 | −2/8 |
| (8-w) (L0) | 4/8 | 3/8 | 5/8 | −2/8 | 10/8 |

In the affine AMVP mode, the bew_idx may be signaled from the video encoding apparatus to the video decoding apparatus. In the affine merge mode or affine skip mode, the bow_idx may be derived from motion information of a candidate indicated by the merge_subblock_idx.

4) Process of Constructing Candidate List

In the candidate list (sub-block-based merge candidate list or affine merge candidate list) for the affine merge mode (including affine skip mode), sub-block temporal candidates (sub-block temporal MVP (SBTMVP), inherited candidates, constructed candidates, and zero motion vector candidates may be included.

When the number of candidates currently included in the candidate list is less than a maximum number of candidates that can be included in the candidate list, the inherited candidates may be included in the candidate list. When the number of candidates currently included in the candidate list is less than the maximum number of candidates, the constructed candidates may also be included in the candidate list.

The inherited candidates may refer to neighboring blocks predicted through the affine mode (or motion information of the neighboring blocks that have been predicted using the affine mode). The video encoding/decoding apparatus may use, as the inherited candidates, the blocks which have been predicted by the affine mode among the neighboring blocks of the current block, and include the blocks into the candidate list.

The constructed candidates may refer to candidates derived from the blocks that have been predicted in a general inter mode. The video encoding/decoding apparatus may generate an affine model from the blocks which have been predicted in the general inter mode among the neighboring blocks of the current block, and may use the generated affine model as the constructed candidates and allow the generated affine model to be included in the candidate list.

Figure 8:
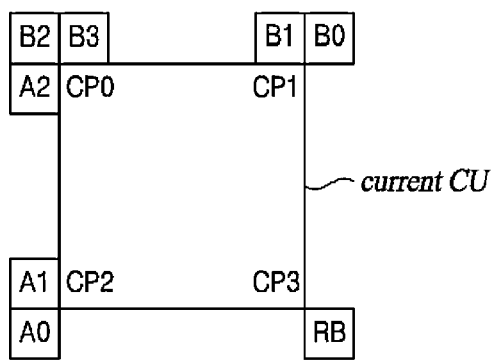
FIG. 8 is a diagram for describing positions of neighboring blocks used in an affine mode.

Positions of neighboring blocks for deriving the inherited candidates and constructed candidates are illustrated in FIG. 8.

The video encoding/decoding apparatus may derive one inherited candidate from left neighboring blocks $A_0$ and $A_1$ and derive one inherited candidate from top neighboring blocks $B_0$, $B_1$, and $B_2$. The left neighboring blocks are searched in the order of $A_0 \rightarrow A_1$, and the first neighboring block predicted in the affine mode may be derived as the inherited candidate. Further, the top neighboring blocks are searched in the order of $B_0 \rightarrow B_1 \rightarrow B_2$, and the first neighboring block predicted in the affine mode may be derived as the inherited candidate. In this case, when a motion of the derived inherited candidate is bidirectional, the bow_idx is also included in motion information of the corresponding inherited candidate.

The video encoding/decoding apparatus May 1) derive MVs (up to four MVs) for each of the CPs set for the current block (CU), and 2) derive constructed candidates from the derived MVs, to generate affine models.

1) Derivation of MVs for Each of CPs Set for Current Block

The video encoding/decoding apparatus may search the neighboring blocks of the current block in a preset order and set the motion information of the neighboring block predicted in the general inter mode as the motion information (MV) of the corresponding CP.

Motion information of the $CP_0$ (top-left control point) that is set first for the current block may be set from any one piece of motion information among $B_2$, $B_3$, and $A_2$ which are neighboring blocks located at the top left of the current block, and motion information of the $CP_1$ (top-right control point) that is secondly set for the current block may be set from any one piece of motion information among $B_1$ and $B_0$ which are neighboring blocks located at the top right of the current block. Further, motion information of the $CP_2$ (bottom-left control point) that is thirdly set for the current block may be set from any one piece of motion information among $A_1$ and $A_0$ which are neighboring blocks located at the bottom left of the current block, and motion information of the $CP_3$ (bottom-right control point) that is fourthly set for the current block may be set from motion information of a block RB which is a collocated neighboring block (temporal neighboring block) located at the bottom right of the current block.

Specifically, the motion information of the first neighboring block that has been predicted by the general inter mode in the order of $B_2 \rightarrow B_3 \rightarrow A_2$ may be set as the MV (motion information) of the $CP_0$, the motion information of the first neighboring block that has been predicted by the general inter mode the order of $B_1 \rightarrow B_0$ and may be set as the MV of the $CP_1$, the motion information of the first neighboring block that has been predicted by the general inter mode in the order of $A_1 \rightarrow A_0$ may be set as the MV of the $CP_2$, and the motion information of the block RB that is the temporal neighboring block may be set as the MV of the $CP_3$.

The video encoding/decoding apparatus may set the CP, of which the motion information is set, among the CPs as being available.

2) Derivation of Constructed Candidates (Affine Model) Using Up to Four MVs

The video encoding/decoding apparatus may derive up to six affine models (four 6-parameter models+two 4-parameter models) from the set CPs. The CPs used for the derivation of the up to six affine models are as follows: $\{CP_0, CP_1, \text{and } CP_2\}$, $\{CP_0, CP_1, \text{and } CP_3\}$, $\{CP_0, CP_2, \text{and } CP_3\}$, $\{CP_1, CP_2, \text{and } CP_3\}$, $\{CP_0 \text{ and } CP_1\}$, and $\{CP_0 \text{ and } CP_2\}$. Here, each of $\{CP_0, CP_1, \text{and } CP_2\}$, $\{CP_0, CP_1, \text{and } CP_3\}$, $\{CP_0, CP_2, \text{and } CP_3\}$, $\{CP_1, CP_2, \text{and } CP_3\}$, $\{CP_0 \text{ and } CP_1\}$, and $\{CP_0 \text{ and } CP_2\}$ may each be referred to as a "CPs group."

When all the CPs included in the CPs group are available, prediction directions of the CPs are identical, and reference pictures of the CPs are identical, the affine model of the corresponding CPs group may be derived or generated. The affine model (first affine model) from the $\{CP_0, CP_1, \text{and } CP_2\}$ may be derived as $\{CP_0, CP_1, \text{and } CP_2\}$, the affine model (second affine model) from the $\{CP_0, CP_1, \text{and } CP_3\}$ may be derived as $\{CP_0, CP_1, \text{and } (CP_3+CP_0-CP_1)\}$, the affine model (third affine model) from the $\{CP_0, CP_2, \text{and } CP_3\}$ may be derived as $\{CP_0, (CP_3+CP_0-CP_2), \text{and } CP_2\}$, the affine model (fourth affine model) from the $\{CP_1, CP_2, \text{and } CP_3\}$ may be derived as $\{(CP_1+CP_2-CP_3), CP_1, \text{and } CP_2\}$, the affine model (fifth affine model) from the $\{CP_0 \text{ and } CP_1\}$ may be derived as $\{CP_0 \text{ and } CP_1\}$, and the affine model (sixth affine model) from the $\{CP_0 \text{ and } CP_2\}$ may be derived as $\{CP_0 \text{ and } (CP_2-CP_0)\}$.

When at least one of the CPs included in a specific CPs group is non-available or the prediction directions and the reference pictures are different from each other, the affine model of the corresponding CPs group may not be generated.

For example, when all the CPs of the $\{CP_0, CP_1, \text{and } CP_2\}$ are available, all the prediction directions are bidirectional, the reference picture of the list 0 is a $1^{st}$ index, and the reference picture of the list 1 is the $0^{th}$ index, the corresponding affine model may be generated as $\{CP_0, CP_1, \text{and } CP_2\}$ as follows:

cu_affine_type_flag: 6-parameter, inter_pred_idc: bi, ref_idx_l0:$1^{st}$ idx, ref_idx_l1:$0^{th}$ idx, $CPMV_0$:$CP_0$, $CPMV_1$:$CP_1$, $CPMV_2$:$CP_2$, and bcw_idx: undecided.

In this case, since the bow_idx of $CP_0$, $CP_1$, and $CP_2$ may be different from each other, a process of deriving one bcw_idx for the corresponding affine model (constructed candidate) is required.

In the present invention, a method of deriving a bcw_idx for a constructed candidate included in the candidate list (affine merge candidate list) is proposed.

Figure 9:
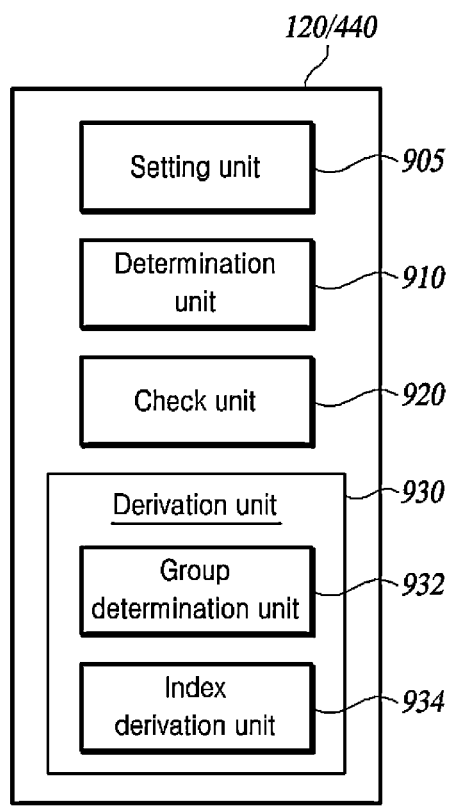
FIG. 9 is an exemplary block diagram of a prediction unit that can implement techniques of the present invention.
Figure 10:
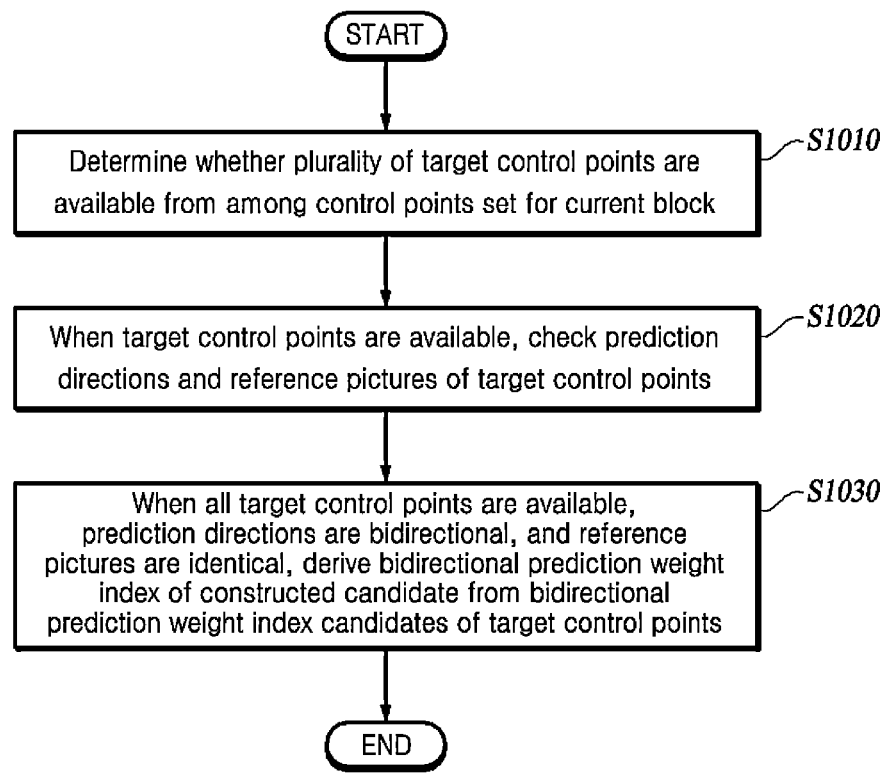
FIG. 10 is a flowchart for describing an example of deriving a bidirectional prediction weight index.
Figure 11:
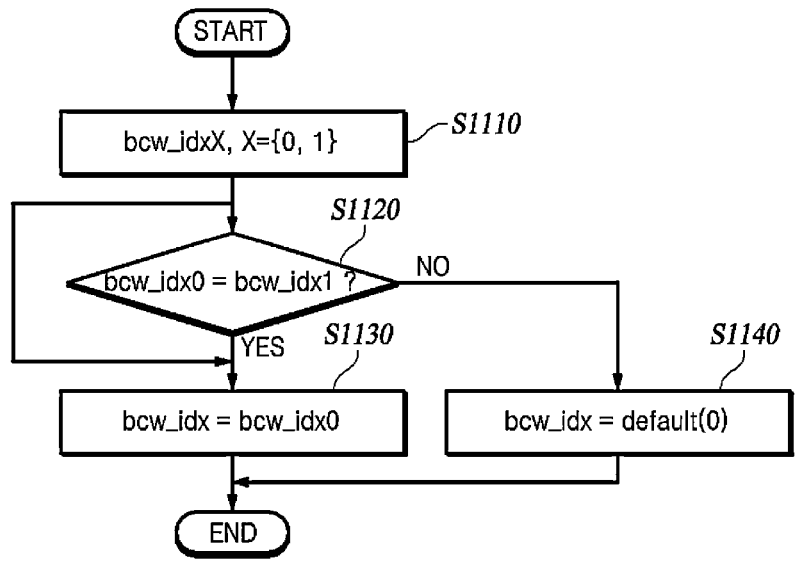
FIGS. 11 to 14 are flowcharts for describing various examples of deriving a bidirectional prediction weight index.
Figure 12:
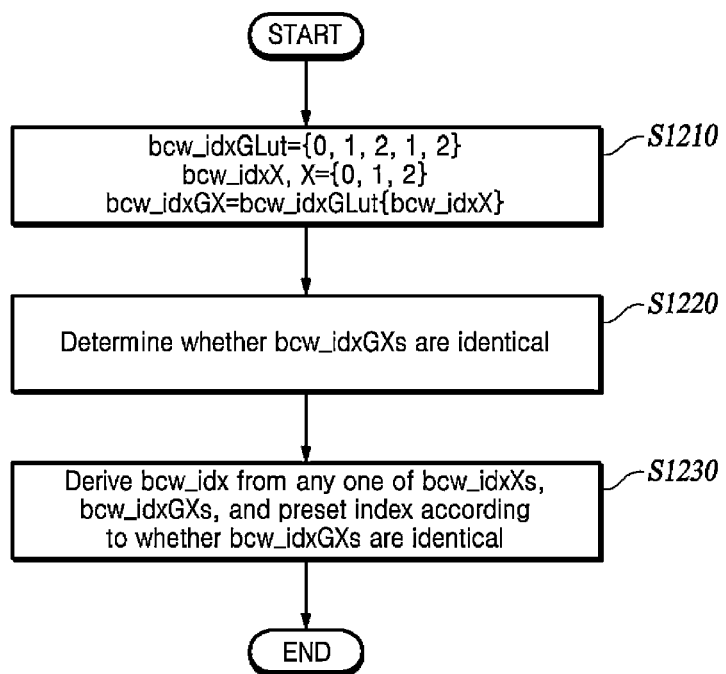
Figure 13:
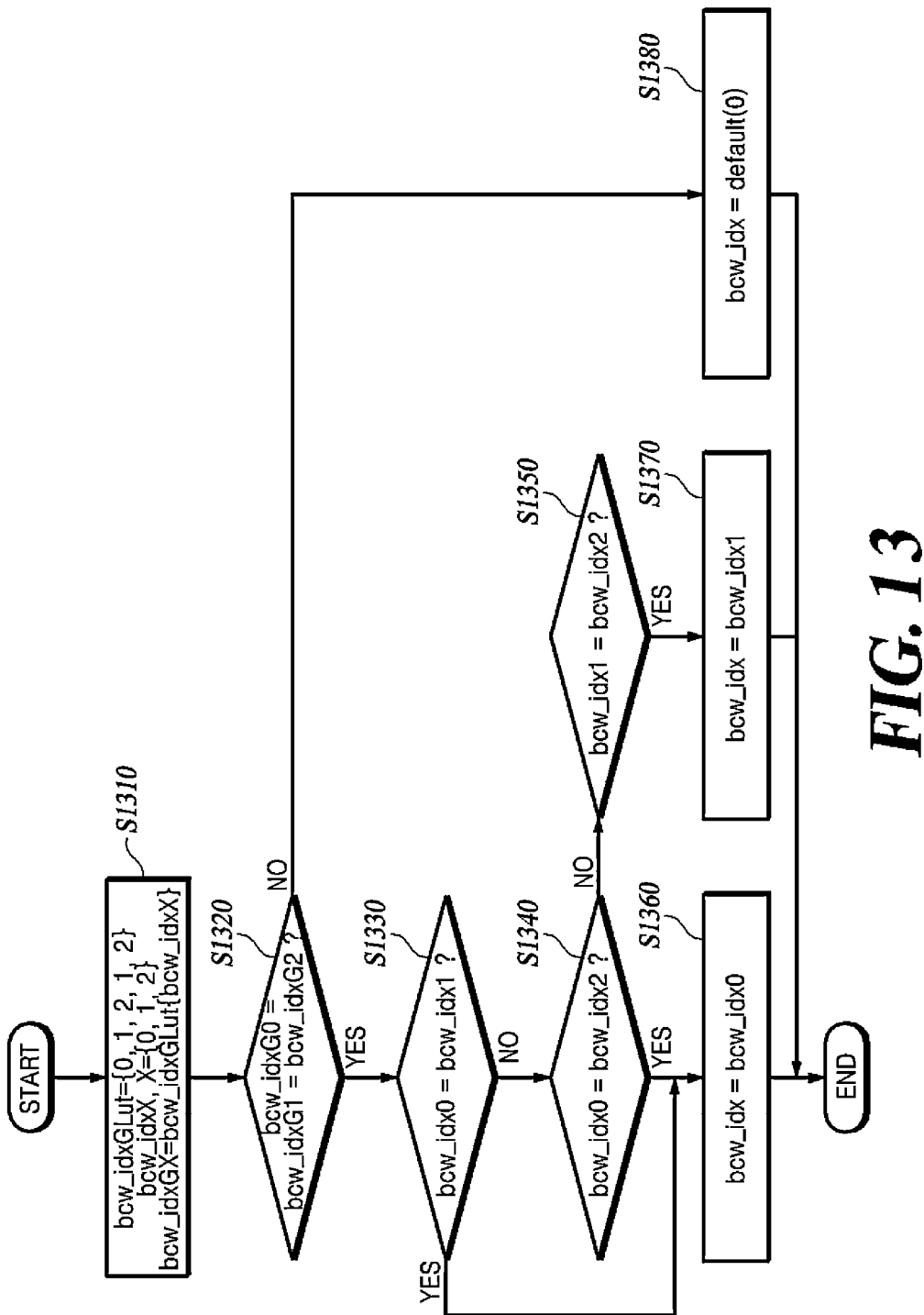
Figure 14:
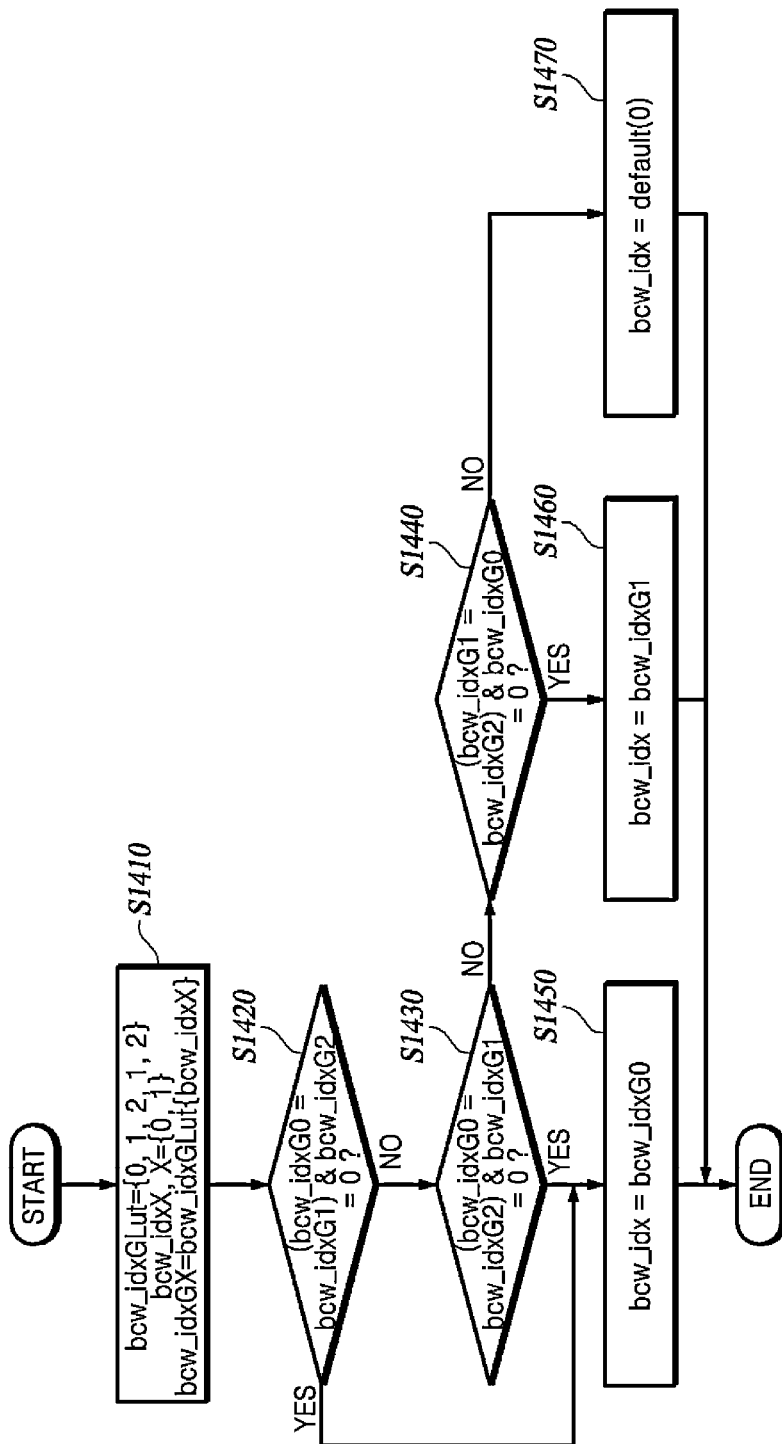

An exemplary block diagram of the predictors 120 and 440 that can implement techniques of the present invention is illustrated in FIG. 9. Each of the predictors 120 and 440 may include a setting unit 905, a determination unit 910, a check unit 920, and a derivation unit 930, and the derivation unit 930 may include a group determination unit 932 and an index derivation unit 934.

The setting unit 905 may set motion information of CPs using available motion information among pieces of motion information of neighboring blocks of a current block. Further, the setting unit 905 may set the CPs, of which the motion information is set, as available.

The determination unit 910 may determine whether a plurality of CPs (target control points) are available from among the CPs set for the current block (S1010). Here, the target CPs may correspond to CPs included in any one of up to six CPs groups.

When all the target CPs are available, the check unit 920 may check prediction directions and reference pictures of the target CPs (S1020). That is, the check unit 920 may check or determine whether all the prediction directions of the target CPs are bidirectional and all the reference pictures of the target CPs are identical.

The processes S1010 and S1020 may be understood as processes of determining the above-described affine model generation conditions (all the CPs are available, the prediction directions are identical, and the reference pictures are identical).

When all the target CPs are available, the prediction directions are identical, and the reference pictures are identical (i.e., when the corresponding affine model is generated), the derivation unit 930 may derive a bidirectional prediction weight index (hereinafter, referred to as "bcw_idx") of the corresponding constructed candidate from bidirectional prediction weight indexes (bidirectional prediction weight index candidates (bcw_idxXs) of the target CPs (S1030).

Embodiment 1

Embodiment 1 is a method of deriving a bcw_idx of a constructed candidate on the basis of the order in which target CPs are set for a current block.

bcw_idxXs may indicate bidirectional prediction weight index candidates of target CPs included in an affine model. When the affine model is {CPa, CPb, and CPc}, which is a 6-parameter model, the bcw_idxXs may include a bcw_idxa, a bcw_idxb, and a bcw_idxc. When the affine model is {CPa and CPb}, which is a 4-parameter model, the bcw_idxX may include a bcw_idxa and a bcw_idxb.

The video encoding/decoding apparatus may set the bow_idxX according to the order in which each CP is set (S1110). Although {$CP_0$ and $CP_1$} which is a 4-parameter affine model is shown in FIG. 1, Embodiment 1 may be applied to {$CP_0$ and $CP_2$} which is another 4-parameter affine model, and also be applied to 6-parameter affine models.

The video encoding/decoding apparatus may derive, as the bow_idx of the constructed candidate, the bidirectional prediction weight index candidate (bcw_idx0) of the $CP_0$, which is set first for the current block, among the target CPs (S1130). In other words, the video encoding/decoding apparatus may set the bow_idx to bcw_idx0 which is the index of the first CP among the bcw_idxXs.

In some embodiments, the derivation unit 930 may further include a process of determining whether the bcw_idxXs are identical (S1120).

The fact that the bow_idxXs are identical means that there are more CPs that apply a greater weight to a specific direction among a list 0 direction and a list 1 direction. Therefore, the process S1120 of determining whether the bcw_idxXs are identical may be a process of matching a prediction direction to which the bow_idx gives a greater weight with a prediction direction to which the CPs apply a greater weight.

When the bow_idxXs are identical (bcw_idx0=bcw_idx1), the bcw_idx0 of the CP which is set first for the current block among the target CPs may be derived as the bcw_idx (S1130). On the contrary, when the bow_idxXs are different (bcw_idx0 #bcw_idx1), a preset index (default) may be derived as the bcw_idx (bcw_idx=default(0)) (S1140). Here, the preset index may be an index for assigning the same weight to the list 0 direction and the list 1 direction.

Embodiment 2

Embodiment 2 is a method of classifying bcw_idxXs into groups according to a prediction direction that a greater (or less) weight is assigned among a list 0 direction and a list 1 direction.

The groups may be divided into a group (group 0, G0) in which the same weight is applied to the list 0 direction and the list 1 direction, a group (group 1, G1) in which a greater weight is applied to the list 1 direction, and a group (group 2, G2) in which a greater weight is applied to the list 0 direction. A separate index (group index, bcw_group) may be given or assigned to each group on the basis of the magnitude of the weight applied to the list 0 direction and the list 1 direction.

The groups (bcw_group) and the bcw_idx (bcw_idxX) divided into the groups are shown in Table 7.

TABLE 7

| bcw_idx | 0 | 1 | 2 | 3 | 4 |
|---|---|---|---|---|---|
| bcw_group | 0 | 1 | 2 | 3 | 4 |
| w (L1) | 4/8 | 5/8 | 3/8 | 10/8 | −2/8 |
| (8-w) (L0) | 4/8 | 3/8 | 5/8 | −2/8 | 10/8 |

In some embodiments, the groups may also be expressed in the form of an array (look-up table (LUT)) as follows.

$$Bcw\_idxGLut[k] = \{0, 1, 2, 3, 1, 2\}$$

The video encoding/decoding apparatus may set the bcw_idxX according to the order in which the CPs are set (S1210). Further, the video encoding/decoding apparatus may set the groups (bcw_idxGLut={0, 1, 2, 1, and 2}) and set the groups (bcw_idxGXs) to which the bcw_idxXs belong (bcw_idxGX=bcw_idxGLut {bcw_idxX}) (S1210).

The video encoding/decoding apparatus (group determination unit) may determine whether groups to which the bow_idxGXs belong are identical to each other (S1220). Further, the video encoding/decoding apparatus (index derivation unit) may derive the bcw_idx from any one of bcw_idxXs, bcw_idxGXs, and a preset index (default) according to whether the groups to which the bow_idxGXs belong are identical (S1230). Here, the preset index may be identical to the default described in Embodiment 1.

Embodiment 2 may be applied to both the 4-parameter affine model and the 6-parameter affine model. However, hereinafter, for convenience of description and understanding, Embodiment 2 will be described focusing on examples applied to the 6-parameter affine models. Furthermore, Embodiment 2 will be described focusing on the {$CP_0$, $CP_1$, and $CP_2$} affine model among the 6-parameter affine models.

Embodiment 2-1

Embodiment 2-1 is a method of deriving a bcw_idx by determining whether all groups (bcw_idxG1, bcw_idxG1, and bcw_idxG2) are identical to each other.

The video encoding/decoding apparatus may set a bcw_idxX (X={0, 1, and 2}), a bcw_idxGLut, and a bcw_idxGX (X={0, 1, and 2}) (S1310).

The video encoding/decoding apparatus may determine whether all the bcw_idxGXs are identical (S1320). When all the three groups are identical (bcw_idxG0=bcw_idxG1=bcw_idxG2), two or more of a bcw_idx0, a bcw_idx1, and a bcw_idx2 may be identical to each other. In this case, the video encoding/decoding apparatus may derive the bow_idx from index candidates which have the same value among the bcw_idx0, the bcw_idx1, and the bcw_idx2.

For example, the video encoding/decoding apparatus may determine whether any two of the bcw_idx0, the bcw_idx1, and the bcw_idx2 are identical (S1330 to S1350). When bcw_idx0=bcw_idx1 (S1330), the bcw_idx0 may be derived as the bcw_idx (S1360). When bcw_idx0=bcw_idx2 (S1340), the bcw_idx0 may be derived as the bcw_idx (S1360). When bcw_idx1=bcw_idx2 (S1350), the bcw_idx1 may be derived as the bcw_idx (S1370). The processes S1330 to S1370 may be processes of setting the bow_idx to an index candidate of a CP which is set first for the current block among the index candidates having the same value.

In process S1320, when one or more of the bcw_idxGXs have different values, the preset index (default(0)) may be derived as the bow_idx (S1380).

The process S1360, in which the bcw_idx0 is derived as the bcw_idx through the processes S1320 and S1330, may be a process in which the bcw_idx0 is derived as the bcw_idx when bcw_idx0=bcw_idx1 and bcw_idx_G0-bcw_idxG2. The process S1360, in which the bcw_idx0 is derived as the bow_idx through the processes S1320 and S1340, may be a process in which the bcw_idx0 is derived as the bow_idx when bcw_idx0=bcw_idx2 and bcw_idx_G0-bcw_idxG1. The process S1370, in which the bcw_idx1 is derived as the bcw_idx through the processes S1320 and S1350, may be a process in which the bcw_idx1 is derived as the bow_idx when bcw_idx1=bcw_idx2 and bcw_idx_G1=bcw_idxG0.

Embodiment 2-1 is applied to various affine models as follows.

TABLE 8

|  | L0 (w0) | L1 (w1) |
| --- | --- | --- |
| CP0 | 10/8 | −2/8 |
| CP1 | 10/8 | −2/8 |
| CP2 | 5/8 | 3/8 |

When the affine model is as shown in Table 8, bcw_idxG0=bcw_idxG1=bcw_idxG2=2 and bcw_idx0-bcw_idx1-4. Therefore, the bcw_idx may be derived as follows: bcw_idx=bcw_idx0=4 (L0:L1=10/8:−2/8).

TABLE 9

|  | L0 (w0) | L1 (w1) |
| --- | --- | --- |
| CP0 | 10/8 | −2/8 |
| CP1 | 5/8 | 3/8 |
| CP2 | 5/8 | 3/8 |

When the affine model is as shown in Table 9, bcw_idxG0=bcw_idxG1=bcw_idxG2=2 and bcw_idx1=bcw_idx2=2. Therefore, the bcw_idx may be derived as follows: bcw_idx=bcw_idx1=2 (L0:L1=5/8:3/8).

TABLE 10

|  | L0 (w0) | L1 (w1) |
| --- | --- | --- |
| CP0 | 10/8 | −2/8 |
| CP1 | 5/8 | 3/8 |
| CP2 | 4/8 | 4/8 |

When the affine model is as shown in Table 10, bcw_idxG0=bcw_idxG1 #bcw_idxG2. Therefore, the bow_idx may be derived as follows: bcw_idx=default=0 (L0:L1=4/8:4/8).

TABLE 11

|  | L0 (w0) | L1 (w1) |
| --- | --- | --- |
| CP0 | 3/8 | 5/8 |
| CP1 | 5/8 | 3/8 |
| CP2 | 5/8 | 3/8 |

When the affine model is as shown in Table 11, bcw_idxG0≠bcw_idxG1=bcw_idxG2. Therefore, the bcw_idx may be derived as follows: bcw_idx=default=0 (L0:L1=4/8:4/8).

Embodiment 2-2

Embodiment 2-2 is a method of deriving a bcw_idx by determining whether all remaining groups are identical except for a corresponding group when any one of groups (bcw_idxG0, bcw_idxG1, and bcw_idxG2) is a zero group. The zero group may be a group of applying the same weight to bidirectional predictions.

The video encoding/decoding apparatus may set bcw_idxXs (X={0, 1, and 2}), bcw_idxGLut, and bcw_idxGXs (X={0, 1, and 2}) (S1410).

The video encoding/decoding apparatus may determine whether bcw_idxGXs are identical to each other and whether any one group of the bow_idxGXs corresponds to the zero group (S1420). The video encoding/decoding apparatus may derive a bcw_idx from the identical bow_idxGXs or a preset index according to a determination result in process S1420.

As an example, in process S1420, when any two groups among the bcw_idxGXs are identical to each other (bcw_idxG0=bcw_idxG1) and the other group is the zero group (bcw_idxG2=0), a first group index (bcw_idxG0) among group indexes (bcw_idxG0 and bcw_idxG1) assigned to the identical groups (bcw_idxG0-bcw_idxG1) may be derived as the bcw_idx (S1450).

As another example, in process S1430, when bcw_idxG0-bcw_idxG2 and bcw_idxG1=0, the first group index (bcw_idxG0) may be derived as the bow_idx (S1450). As still another example, in process S1440, when bcw_idxG1=bcw_idxG2 and bcw_idxG0-0, the first group index (bcw_idxG1) may be derived as the bow_idx (S1460).

When all the bow_idxGXs are different or there is no zero group among the bcw_idxGXs, the preset index (default (0)) may be derived as the bcw_idx (S1470).

When Embodiment 2-2 is applied to the various affine models of Tables 8 to 11, the same result as those in Embodiment 2-1 may be derived except for Table 10. I In the case of the affine model shown in Table 10, bcw_idxG0=bcw_idxG1=2 and bcw_idxG2=0. Therefore, the bcw_idx may be derived as bcw_idx=bcw_idxG0=2 (L0:L1=5/8:3/8).

Embodiment 3

Embodiment 3 is a method of deriving a bcw_idx from a median value of weights indicated by bcw_idxXs or an average value of the weights indicated by the bcw_idxXs.

The video encoding/decoding apparatus may determine a median value of weights indicated by bcw_idxXs and derive a bcw_idxX corresponding to the median value as a bcw_idx. Further, the video encoding/decoding apparatus may determine an average value of the weights indicated by the bcw_idxXs and derive a bcw_idxX corresponding to the average value as the bow_idx. When there is no bcw_idxX corresponding to the average value of the weights, a bcw_idxX having a weight closest to the corresponding average value may be derived as the bow_idx.

Embodiment 3 (using the median value) is applied to the various affine models of Tables 8 to 11 as follows.

When the affine model is as shown in Table 8, the median value of the weights indicated by the bow_idxXs is 10/8:−2/8, and thus the bow_idxX having the corresponding median value is a bcw_idx0 and a bcw_idx1. Therefore, the bcw_idx may be derived as bcw_idx=bcw_idx0/bcw_idx1=4.

When the affine model is as shown in Table 9, the median value of the weights indicated by the bcw_idxXs is 5/8:3/8, and thus the bow_idxX having the corresponding median value is a bcw_idx1 and a bcw_idx2. Therefore, the bcw_idx may be derived as bcw_idx=bcw_idx1/bcw_idx2=2.

When the affine model is as shown in Table 10, the median value of the weights indicated by the bcw_idxXs is 5/8:3/8, and thus the bow_idxX having the corresponding median value is a bcw_idx1. Therefore, the bow_idx may be derived as bcw_idx=bcw_idx1=2.

When the affine model is as shown in Table 11, the median value of the weights indicated by the bcw_idxXs is 5/8:3/8, and thus the bcw_idxX having the corresponding median value is a bcw_idx1 and a bcw_idx2. Therefore, the bcw_idx may be derived as bcw_idx=bcw_idx1/bcw_idx2=2.

Although exemplary embodiments of the present invention have been described for illustrative purposes, those skilled in the art will appreciate that and various modifications and changes are possible, without departing from the idea and scope of the invention. Exemplary embodiments have been described for the sake of brevity and clarity. Accordingly, one of ordinary skill would understand that the scope of the present invention is not limited by the embodiments explicitly described above but is inclusive of the claims and equivalents thereto.

What is claimed is:

1. A video encoding method, for encoding a current block based on deriving a bidirectional prediction weight index of a constructed candidate included in an affine merge candidate list, the method comprising:
    encoding a flag indicating whether an affine mode is allowed for the current block;
    deriving motion information of control points which respectively correspond to corners of the current block, when the flag indicating that the affine mode is allowed for the current block,
        wherein the motion information of the control points is derived from neighboring blocks of the corners of the current block, and each of the control points is set to be available when motion information thereof is derived;
    selecting, as a group of target control points for the constructed candidate, parts of the control points in a pre-defined order and determining whether the target control points are available;
    when the target control points are available, checking prediction directions and reference pictures of the target control points; and
    when all the prediction directions of the target control points are bidirectional and the reference pictures of the target control points are identical, setting a bidirectional prediction weight index of the constructed candidate included in an affine merge candidate list equal to a bidirectional prediction weight index of a target control point which has been first selected in the pre-defined order among the target control points belonging to the group,
    wherein the bidirectional prediction weight index of the constructed candidate is an index indicating one of a plurality of pre-defined weights which is used for combining two prediction blocks of the current block that are bi-predicted in the affine mode based on motion information of the target control points for the constructed candidate.

2. The method of claim 1, wherein the pre-defined order is an order of top left, top right, bottom left, and bottom right control points.

3. The method of claim 1, wherein the control points set for the current block include a top left control point located at a top left corner of the current block, a top right control point located at a top right corner of the current block, a bottom left control point located at a bottom left corner of the current block, and a bottom right control point located at a bottom right corner of the current block.

4. The method of claim 3, wherein setting the motion information of the control points includes:
    setting first available motion information among pieces of motion information of neighboring blocks located at the top left of the current block as motion information of the top left control point;
    setting first available motion information among pieces of motion information of neighboring blocks located at the top right of the current block as motion information of the top right control point;
    setting first available motion information among pieces of motion information of neighboring blocks located at the bottom left of the current block as motion information of the bottom left control point; and
    when motion information of a collocated neighboring block located at the bottom right of the current block is available, setting the motion information of the collocated neighboring block as motion information of the bottom right control point.

5. A video decoding method comprising:
    decoding a flag indicating whether an affine mode is allowed for a current block;
    deriving motion information of control points which respectively correspond to corners of the current block, when the flag indicating that the affine mode is allowed for the current block,
        wherein the motion information of the control points is derived from neighboring blocks of the corners of the current block, and each of the control points is set to be available when motion information thereof is derived;
    selecting, as a group of target control points for a constructed candidate, parts of the control points in a pre-defined order;
    determining whether the target control points are available;
    checking prediction directions and reference pictures of the target control points when the target control points are available; and
    setting a bidirectional prediction weight index of the constructed candidate equal to a bidirectional prediction weight index of a target control point which has been first selected in the pre-defined order among the target control points belonging to the group, when all the prediction directions of the target control points are bidirectional and the reference pictures of the target control points are identical, wherein the bidirectional prediction weight index of the constructed candidate is an index indicating one of a plurality of pre-defined weights which is used for combining two prediction blocks of the current block that are bi-predicted in the affine mode based on motion information of the target control points for the constructed candidate.

6. The video decoding method of claim 5, wherein the pre-defined order is an order of top left, top right, bottom left, and bottom right control points.

7. The video decoding method of claim 5, wherein the control points set for the current block include a top left control point located at a top left corner of the current block, a top right control point located at a top right corner of the current block, a bottom left control point located at a bottom left corner of the current block, and a bottom right control point located at a bottom right corner of the current block.

8. The video decoding method of claim 7, wherein the setting of the motion information of the control points includes:

setting first available motion information among pieces of motion information of neighboring blocks located at the top left of the current block as motion information of the top left control point, setting first available motion information among pieces of motion information of neighboring blocks located at the top right of the current block as motion information of the top right control point, setting first available motion information among pieces of motion information of neighboring blocks located at the bottom left of the current block as motion information of the bottom left control point, and when motion information of a collocated neighboring block located at the bottom right of the current block are available, setting the motion information of the collocated neighboring block as motion information of the bottom right control point.

9. A method for providing a bitstream containing a video data to a video decoding apparatus, the method comprising:

generating the bitstream by a method of encoding a video based on deriving a bidirectional prediction weight index of a constructed candidate included in an affine merge candidate list; and transmitting the bitstream to the video decoding apparatus, wherein deriving the bidirectional prediction weight index includes:

encoding a flag indicating whether an affine mode is allowed for a current block;

deriving motion information of control points which respectively correspond to corners of the current block, when the flag indicating that the affine mode is allowed for the current block, wherein the motion information of the control points is derived from neighboring blocks of the corners of the current block, and each of the control points is set to be available when motion information thereof is derived;

selecting, as a group of target control points for the constructed candidate, parts of the control points in a pre-defined order and determining whether the target control points are available;

checking prediction directions and reference pictures of the target control points when the target control points are available;

setting the bidirectional prediction weight index of the constructed candidate equal to a bidirectional prediction weight index of a target control point which has been first selected in the pre-defined order among the target control points belonging to the group, when all the prediction directions of the target control points are bidirectional and the reference pictures of the target control points are identical;

wherein the bidirectional prediction weight index of the constructed candidate is an index indicating one of a plurality of pre-defined weights which is used for combining two prediction blocks of the current block that are bi-predicted in the affine mode based on motion information of the target control points for the constructed candidate.

* * * * *